(12) United States Patent
Odake et al.

(10) Patent No.: US 9,877,017 B2
(45) Date of Patent: Jan. 23, 2018

(54) AUTO-STEREOSCOPIC DISPLAY APPARATUS AND METHOD OF DRIVING THE SAME

(71) Applicant: SAMSUNG DISPLAY CO., LTD., Yongin, Gyeonggi-Do (KR)

(72) Inventors: Ryota Odake, Hwaseong-Si (KR); Seonki Kim, Yongin-Si (KR); Jinhwan Kim, Suwon-Si (KR); Haeyoung Yun, Suwon-Si (KR); Kyungho Jung, Gyeonggi-Do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 197 days.

(21) Appl. No.: 14/712,617

(22) Filed: May 14, 2015

(65) Prior Publication Data

US 2015/0334368 A1   Nov. 19, 2015

(30) Foreign Application Priority Data

May 16, 2014   (KR) .................. 10-2014-0059201

(51) Int. Cl.
*H04N 13/00* (2006.01)
*H04N 13/02* (2006.01)
*H04N 13/04* (2006.01)

(52) U.S. Cl.
CPC ..... *H04N 13/0475* (2013.01); *H04N 13/0029* (2013.01); *H04N 13/0271* (2013.01); *H04N 13/0282* (2013.01); *H04N 13/0404* (2013.01); *H04N 13/0409* (2013.01);
(Continued)

(58) Field of Classification Search
CPC .......... H04N 13/0475; H04N 13/0404; H04N 13/0271; H04N 13/0422; H04N 13/0468; H04N 13/0409; H04N 13/0029; H04N 13/0497; H04N 13/0282
See application file for complete search history.

(56) References Cited

U.S. PATENT DOCUMENTS 7,736,005 B2   6/2010  Saishu et al.
9,414,049 B2*  8/2016  Gaudreau .......... G02B 27/2214
2007/0177006 A1 8/2007  De Zwart et al.
(Continued)

FOREIGN PATENT DOCUMENTS

JP   2000-209615   7/2000
JP   2013-098934   5/2013
(Continued)

*Primary Examiner* — Christopher S Kelley
*Assistant Examiner* — Nasim Nirjhar
(74) *Attorney, Agent, or Firm* — F. Chau & Associates, LLC

(57) ABSTRACT

A method of driving an auto-stereoscopic display apparatus includes detecting a position of a user to determine a target visible distance, determining at least one original pixel unit having a first unit width based on the target visible distance, wherein the pixel unit includes a plurality of pixel sets in a row, each pixel set including N pixels, comparing the target visible distance to a predetermined reference visible distance of the auto-stereoscopic display apparatus, and converting the original pixel unit to a compensated pixel unit having a second unit width different from the first unit width to project viewpoint sets through the N pixels to a viewing zone at the target visible distance.

15 Claims, 12 Drawing Sheets

(52) U.S. Cl.
CPC ..... *H04N 13/0422* (2013.01); *H04N 13/0468* (2013.01); *H04N 13/0497* (2013.01)

(56) References Cited

U.S. PATENT DOCUMENTS

| | | |
|---|---|---|
| 2009/0079733 A1 | 3/2009 | Fukushima et al. |
| 2011/0032339 A1* | 2/2011 | Hirayama .......... H04N 13/0011 348/51 |
| 2012/0249530 A1* | 10/2012 | Fukushima ........ G02B 27/2214 345/419 |

FOREIGN PATENT DOCUMENTS

| | | |
|---|---|---|
| KR | 20130089489 | 8/2013 |
| KR | 20130128219 | 11/2013 |

* cited by examiner

AUTO-STEREOSCOPIC DISPLAY APPARATUS AND METHOD OF DRIVING THE SAME

CROSS-REFERENCE TO RELATED APPLICATION

This U.S. non-provisional patent application claims priority under 35 U.S.C. §119 from Korean Patent Application No. 10-2014-0059201, filed on May 16, 2014 in the Korean Intellectual Property Office, and all the benefits accruing therefrom, the contents of which are herein incorporated by reference in their entirety.

BACKGROUND

1. Technical Field

Embodiments of the present disclosure are directed to an auto-stereoscopic display apparatus having a wide viewing angle and a method of driving the auto-stereoscopic display apparatus.

2. Discussion of the Related Art

An auto-stereoscopic display technology applied to a three-dimensional image display apparatus displays a three-dimensional image without shutter glasses. Examples of auto-stereoscopic display technologies include a parallax barrier scheme and a lenticular lens scheme.

A parallax barrier three-dimensional image display apparatus includes a parallax barrier, through which vertical lattice-shape openings are formed, disposed in front of a display panel that includes pixels arranged in rows by columns. The parallax barrier separates a right-eye image and a left-eye image with respect to right and left eyes of an observer to generate binocular disparity in different images.

A lenticular lens three-dimensional image display apparatus includes a lenticular lens sheet that has a plurality of semi-cylindrical lenses arranged in a column direction that are disposed on the display panel, instead of the vertical lattice of the parallax barrier.

SUMMARY

Embodiments of the present disclosure may provide an auto-stereoscopic display apparatus having a wide viewing angle.

Embodiments of the present disclosure may provide a method of driving the auto-stereoscopic display apparatus.

Embodiments of the inventive concept provide a method of driving an auto-stereoscopic display apparatus that includes detecting a position of a user to determine a target visible distance; determining at least one original pixel unit having a first unit width based on the target visible distance, where the pixel unit includes a plurality of pixel sets in a row, each pixel set including N pixels; comparing the target visible distance to a predetermined reference visible distance of the auto-stereoscopic display apparatus; converting the original pixel unit to a compensated pixel unit having a second unit width different from the first unit width; and projecting viewpoint sets through the N pixels to a viewing zone at the target visible distance.

The target visible distance is less than the reference visible distance and the second unit width is greater than the first unit width.

The compensated pixel unit may include a dummy pixel and the second unit width may be greater than the first unit width by a width of the dummy pixel.

M is a number of the pixel sets included in the original pixel unit, L is a number of the original pixel units, and M and L are each a natural number satisfying $$L+1 > \frac{M \times N(W_{ref} - W_t)}{W_t} > L,$$

where "N" denotes a number of the viewpoints, "Wref" denotes a width of the viewpoint image projected at the reference visible distance, and "Wt" denotes a width of the viewpoint image projected to the viewing zone at the target visible distance.

The dummy pixel may be disposed at an end portion of the compensated pixel unit and may display a same image as an image displayed on the pixel disposed adjacent thereto.

The target visible distance may be greater than the reference visible distance and the second unit width may be less than the first unit width.

The method may further include defining one of the pixels of the original pixel unit as a dummy pixel, and excluding the dummy pixel from the compensated pixel unit such that the second unit width becomes narrower than the first unit width by a width of the dummy pixel.

M is a number of the pixel sets included in the original pixel unit, L is a number of the original pixel units, and M and L are each a natural number satisfying $$L+1 > \frac{M \times N(W_t - W_{ref})}{W_t} > L,$$

where "N" denotes a number of the viewpoints, "Wref" denotes a width of the viewpoint image projected at the reference visible distance, and "Wt" denotes a width of the viewpoint image projected to the viewing zone at the target visible distance.

The dummy pixel may be disposed at an end portion of the original pixel unit.

The target visible distance may correspond to an average of distances between the display unit and a plurality of users.

Embodiments of the inventive concept provide an auto-stereoscopic display apparatus that includes a display unit that includes a plurality of original pixel units, each original pixel unit including a plurality of pixel sets arranged in a row, each pixel set including N pixels, the pixel sets displaying viewpoint sets that include N viewpoint images through the N pixels; a multi-viewpoint forming unit that faces the display unit to project the viewing sets to a plurality of viewing zones; a timing controller that outputs image data that includes pixel data corresponding to the pixels; a tracking part for detecting a position of a user and outputting a user position information; and a mapping part that includes a calculating unit for determining a target visible distance based on the user position information and for comparing the target visible distance to a reference visible distance to output a comparison result, and a mapping unit for receiving the image data and the comparison result and for converting the original pixel unit to a compensated pixel unit having a width different from that of the original pixel unit.

The target visible distance may be less than the reference visible distance.

The mapping unit may insert a dummy pixel data into the image data on the basis of the comparison result to convert the original pixel unit to the compensated pixel unit, where the width of the compensated pixel unit may be greater than the width of the original pixel unit by a width of the dummy pixel.

M is a number of the pixel sets included in the original pixel unit, L is a number of the original pixel units, and M and L are each a natural number satisfying $$L+1 > \frac{M \times N(W_{ref} - W_t)}{W_t} > L,$$

where "Wref" denotes a width of the viewpoint image projected at the reference visible distance and "Wt" denotes a width of the viewpoint image projected at the target visible distance.

The target visible distance may be greater than the reference visible distance.

The mapping unit may define one of the pixels of the original pixel unit as a dummy pixel, and may exclude the dummy pixel from the compensated pixel unit such that the width of the compensated pixel unit becomes less than the width of the original pixel unit by a width of the dummy pixel.

M is a number of the pixel sets included in the original pixel unit, L is a number of the original pixel units, and M and L are each a natural number satisfying $$L+1 > \frac{M \times N(W_t - W_{ref})}{W_t} > L$$

where "Wref" denotes a width of the viewpoint image projected at the reference visible distance and "Wt" denotes a width of the viewpoint image projected at the target visible distance.

Embodiments of the inventive concept provide auto-stereoscopic display apparatus that includes a display unit with a plurality of original pixel units, each original pixel unit including a plurality of pixel sets arranged in a row, each pixel set including N pixels, wherein the pixel sets display viewpoint sets that include N viewpoint images through the N pixels; a tracking part for detecting a position of a user and for outputting a user position information; and a mapping part that includes a calculating unit for determining a target visible distance of the user based on the user position information and for comparing the target visible distance to a reference visible distance and outputting a comparison result, and a mapping unit for receiving the image data and the comparison result and for converting the original pixel unit to a compensated pixel unit having a width different from that of the original pixel unit. M is a number of the pixel sets included in the original pixel unit, L is a number of the original pixel units, and M and L are each a natural number that satisfies $$L+1 > \frac{M \times N|W_{ref} - W_t|}{W_t} > L,$$

wherein "Wref" denotes a width of the viewpoint image projected to the reference visible distance and "Wt" denotes a width of the viewpoint image projected to a plurality of viewing zones at the target visible distance.

The target visible distance may be less than the reference visible distance, the compensated pixel unit may include a dummy pixel, and a width of the compensated pixel unit may be greater than a width of the original pixel unit by a width of the dummy pixel.

The target visible distance may be greater than the reference visible distance, one pixel of the original pixel unit may be defined as a dummy pixel, wherein the dummy pixel is excluded from the compensated pixel unit such that a width of the compensated pixel unit may be narrower than a width of the original pixel unit by a width of the dummy pixel.

According to the above, a target visible distance may be determined based on the positions of the users, the target visible distance is compared to the reference visible distance, and the width of the pixel unit is changed depending on the positions of the users. Thus, the viewing range of the auto-stereoscopic display apparatus may be broadened.

DETAILED DESCRIPTION

It will be understood that when an element or layer is referred to as being "on", "connected to" or "coupled to" another element or layer, it can be directly on, connected or coupled to the other element or layer or intervening elements or layers may be present. Like numbers may refer to like elements throughout.

Hereinafter, embodiments of the present disclosure will be explained in detail with reference to the accompanying drawings.

Figure 1:
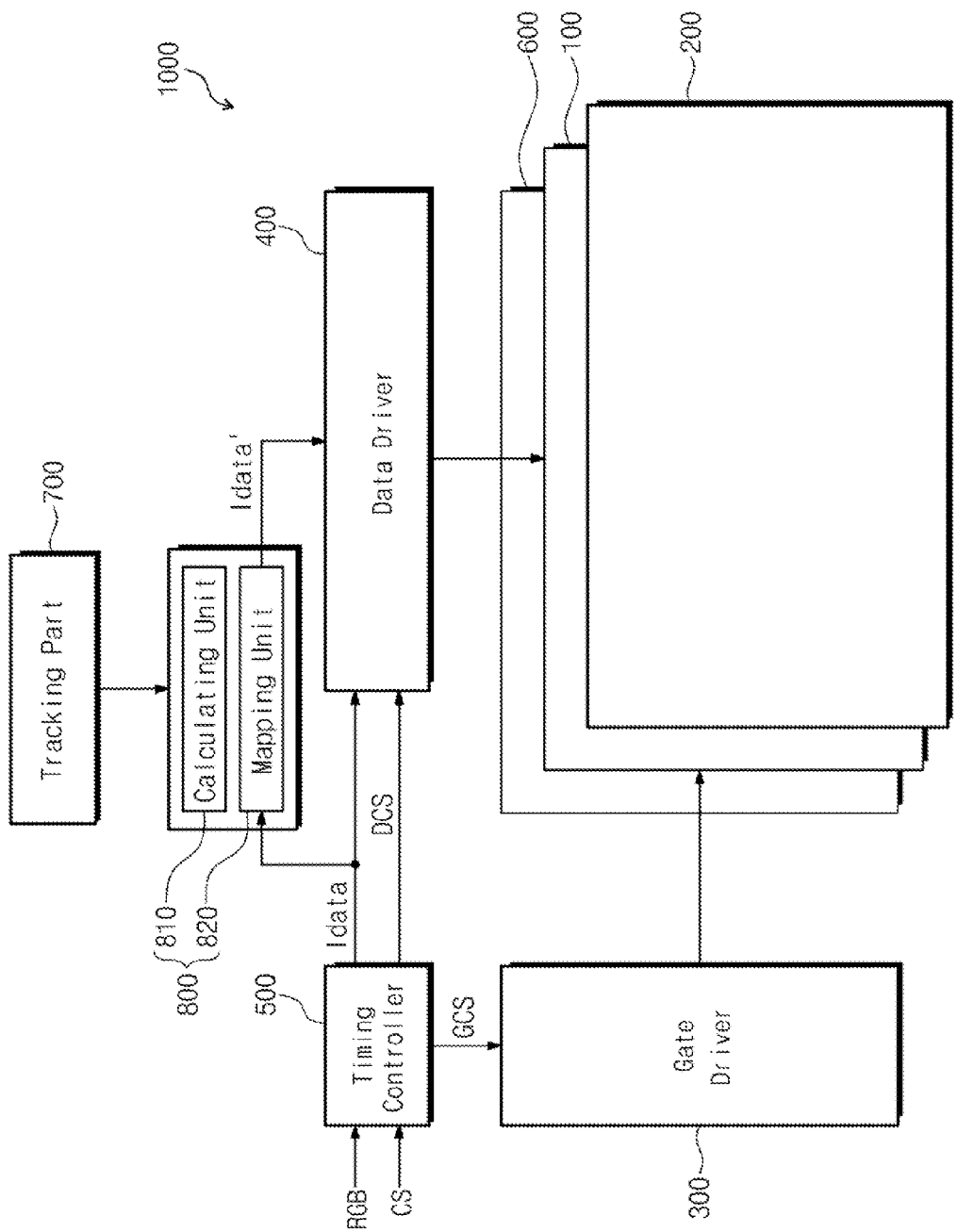
FIG. 1 is a block diagram of an auto-stereoscopic display apparatus according to an exemplary embodiment of the present disclosure.

FIG. 1 is a block diagram of an auto-stereoscopic display apparatus 1000 according to an exemplary embodiment of the present disclosure.

Referring to FIG. 1, the auto-stereoscopic display apparatus 1000 includes a display unit 100 to display an image, a multi-viewpoint forming unit 200 disposed in front of the display unit 100, gate and data drivers 300 and 400 to drive the display unit 100, a timing controller 500 to control the gate and data drivers 300 and 400, and a backlight unit 600 to supply light to the display unit 100.

The timing controller 500 receives externally supplied image information RGB and control signals CS. The timing controller 500 converts a data format of the image information RGB to a data format appropriate to an interface between the data driver 400 and the timing controller 500 and generates image data Idata.

The timing controller 500 generates a data control signal DCS, such as an output start signal, a horizontal start signal, etc., and a gate control signal GCS, such as a vertical start signal, a vertical clock signal, a vertical clock bar signal, etc., on the basis of the control signals CS. The data control signal DCS is applied to the data driver 400 and the gate control signal GCS is applied to the gate driver 300.

The gate driver 300 sequentially outputs gate signals in response to the gate control signal GCS received from the timing controller 500.

The auto-stereoscopic display apparatus 1000 includes a tracking part 700 that detects a position of a user and outputs user position information about the user and a mapping part 800 that processes the image data Idata on the basis of the user position information and outputs the image data Idata' to the data driver 400.

In more detail, the mapping part 800 includes a calculating unit 810 and a mapping unit 820. The calculating unit 810 receives user position information from the tracking part 700, determines a target visible distance based on the user position information, and outputs a compared result of the target visible distance and a reference visible distance. The mapping unit 820 maps the image data Idata on the basis of the image data Idata and generates the mapped image data Idata'.

Figure 2:
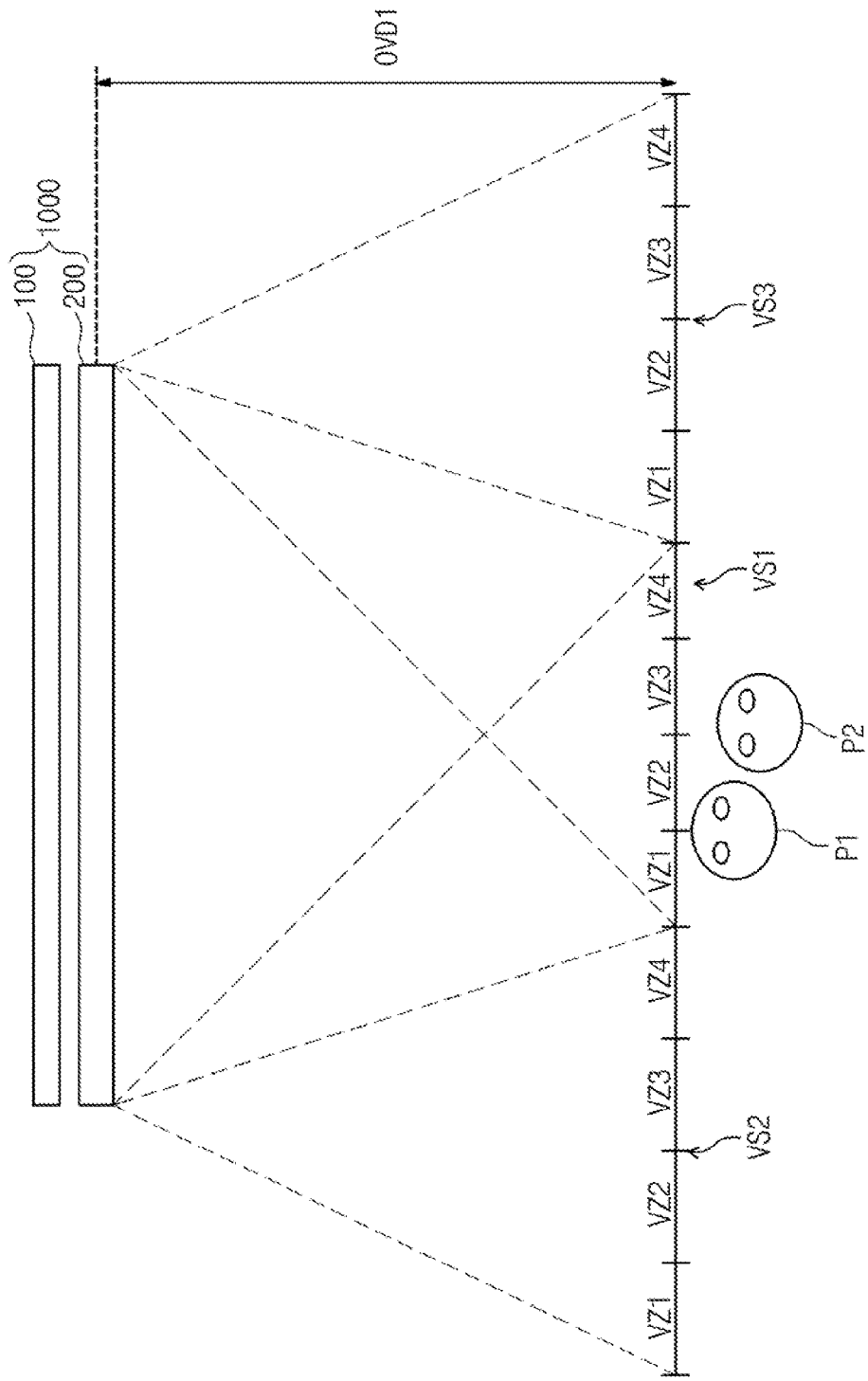
FIG. 2 illustrates a method of displaying a three-dimensional image using an auto-stereoscopic display apparatus according to an exemplary embodiment of the present disclosure.

FIG. 2 illustrates a method of displaying a three-dimensional image using an auto-stereoscopic display apparatus according to an exemplary embodiment of the present disclosure.

The image displayed through the display unit 100 includes a plurality of viewpoints. As an example, the image includes first, second, third, and fourth viewpoints, however, embodiments are not limited to four viewpoints.

The display unit 100 displays the first to fourth viewpoints. The multi-viewpoint forming unit 200 receives the first to fourth viewpoints and refracts the first to fourth viewpoints to project the first to fourth viewpoints to a plurality of reference viewing sets defined at a reference visible distance OVD1. The reference visible distance OVD1 corresponds to a distance between the multi-viewpoint forming unit 200 and the reference viewing sets.

The reference viewing sets include a first reference viewing set VS1 and second and third reference viewing sets VS2 and VS3, which are respectively disposed at each side of the first reference viewing set VS1, but the number of the reference viewing sets is not limited thereto. Since the first to third reference viewing sets VS1 to VS3 are similar to each other, hereinafter, only the first reference viewing set VS1 will be described in detail and details of the second and third reference viewing sets VS2 and VS3 will be omitted.

The first reference viewing set VS1 includes first, second, third, and fourth viewing zones VZ1, VZ2, VZ3, and VZ4 sequentially arranged in a row. The multi-viewpoint forming unit 200 refracts the first to fourth viewpoints and projects the first to fourth viewpoints to the first to fourth viewing zones VZ1 to VZ4, respectively.

In FIG. 2, a left eye of a first user P1 perceives the first viewpoint in the first viewing zone VZ1 and a right eye of the first user P1 perceives the second viewpoint in the second viewing zone VZ2. Accordingly, the first user P1 perceives the first and second viewpoints respectively through the left and right eyes, and thus the first user P1 can perceive a three-dimensional image due to binocular disparity. Similarly, a left eye of a second user P2 perceives the second viewpoint in the second viewing zone VZ2 and a right eye of the second user P2 perceives the third viewpoint in the third viewing zone VZ3. Therefore, since the second user P2 perceives the second and third viewpoints respectively through the left and right eyes, the second user P2 can perceive a three-dimensional image due to binocular disparity. The first and second users P1 and P2 perceive the three-dimensional image through different pairs of images, and thus the first and second users P1 and P2 perceive three-dimensional images that are different from each other. As described above, a user perceives different viewpoints through the left and right eyes along a horizontal direction in the first reference viewing set VS1, so that the user can perceive different three-dimensional images in one direction in the first reference viewing set VS1. However, when the user perceives adjacent viewpoints in different reference viewing sets on either side of a boundary between adjacent reference viewing sets through the left and right eyes, the user perceives an abnormal image. When a user perceives an abnormal image, the user may get eyestrain from the three-dimensional effect and depth differences between images opposite to each other.

The tracking part 700 (refer to FIG. 1) tracks the positions of the first and second users P1 and P2 who perceive the image displayed in the display unit 100. To this end, the tracking part 700 may include a stereo IR camera.

Figure 3:
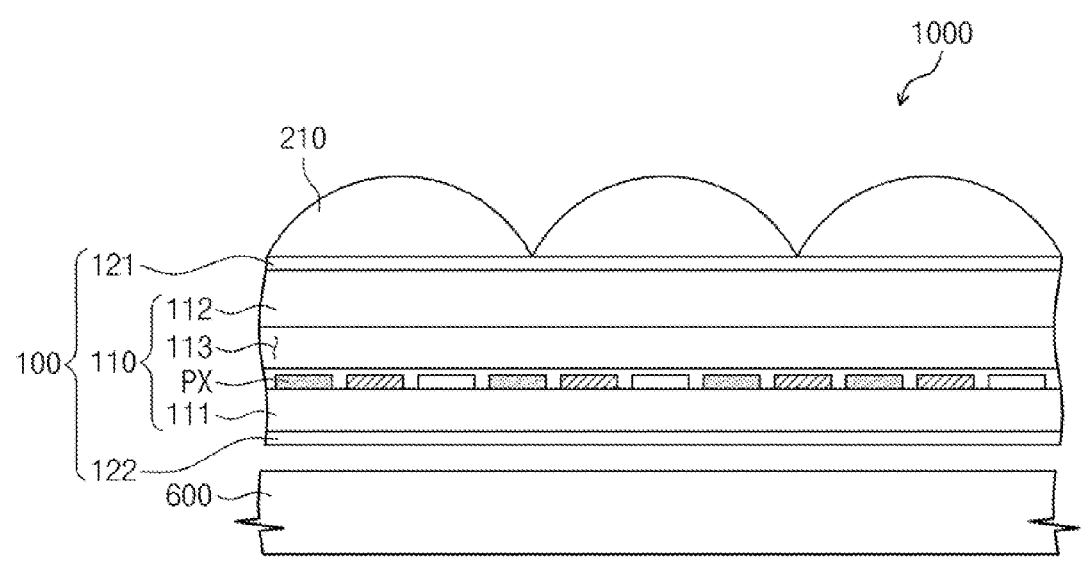
FIG. 3 is a cross-sectional view of an auto-stereoscopic display apparatus shown in FIG. 2.

FIG. 3 is a cross-sectional view of an auto-stereoscopic display apparatus shown in FIG. 2.

Referring to FIG. 3, the display unit 100 includes a liquid crystal display panel 110 that includes a plurality of pixels PX arranged in rows and columns. The liquid crystal display panel 110 includes a first substrate 111, a second substrate 112, and a liquid crystal layer 113 interposed between the first substrate 111 and the second substrate 112.

The display unit 100 may include an organic light emitting display panel or an electrophoretic display panel instead of the liquid crystal display panel 110.

The pixels PX are disposed on the first substrate 111 and include pixel electrodes, respectively. Although not shown in figures, the first substrate 111 includes gate lines extending in a first direction, data lines extending in a second direction substantially perpendicular to the first direction, and thin film transistors connected to the pixel electrodes in a one-to-one correspondence.

In addition, each pixel PX may further include a color filter layer configured to include red, green, and blue color pixels. The pixel electrodes may be disposed to correspond to the color filter layers in a one-to-one correspondence.

The liquid crystal layer 113 includes liquid crystal molecules that align in response to an electric field formed between the first and second substrates 111 and 112.

The display unit 100 may further include first and second polarizers 121 and 122 respectively attached to upper and lower surfaces of the liquid crystal display panel 110. The first and second polarizers 121 and 122 have optical axes substantially perpendicular to each other.

The multi-viewpoint forming unit 200 is a film disposed on the display unit 100 that includes a plurality of lenticular lenses 210. The lenticular lenses 210 are arranged in the first direction of the pixel PX and each lenticular lens 210 has a semi-cylinder shape that extends in the second direction of the pixel PX.

In a present exemplary embodiment, the multi-viewpoint forming unit 200 includes the lenticular lenses 210, but is not limited thereto. That is, the multi-viewpoint forming unit 200 may include a lenticular device configured to include two substrates and a liquid crystal lens layer interposed between the two substrates. The lenticular device controls the liquid crystal lens layer using electrodes respectively applied to the two substrates to switch between a two-dimensional mode and a three-dimensional mode or vice versa. The display unit 100 transmits the image displayed therethrough to display a two-dimensional image during the two-dimensional mode and refracts the image displayed therethrough to display a three-dimensional image during the three-dimensional mode.

The backlight unit 600 is disposed at a rear side of the display unit 100 to supply the light to the display unit 100. The backlight unit 600 includes light emitting diodes or a cold cathode fluorescent lamp as its light source. The light generated by the backlight unit 600 is polarized by the second polarizer 122, and thus only a component of the polarized light that is substantially parallel to the polarizing axis of the second polarizer 122 is supplied to the liquid crystal display panel 110.

Figure 4:
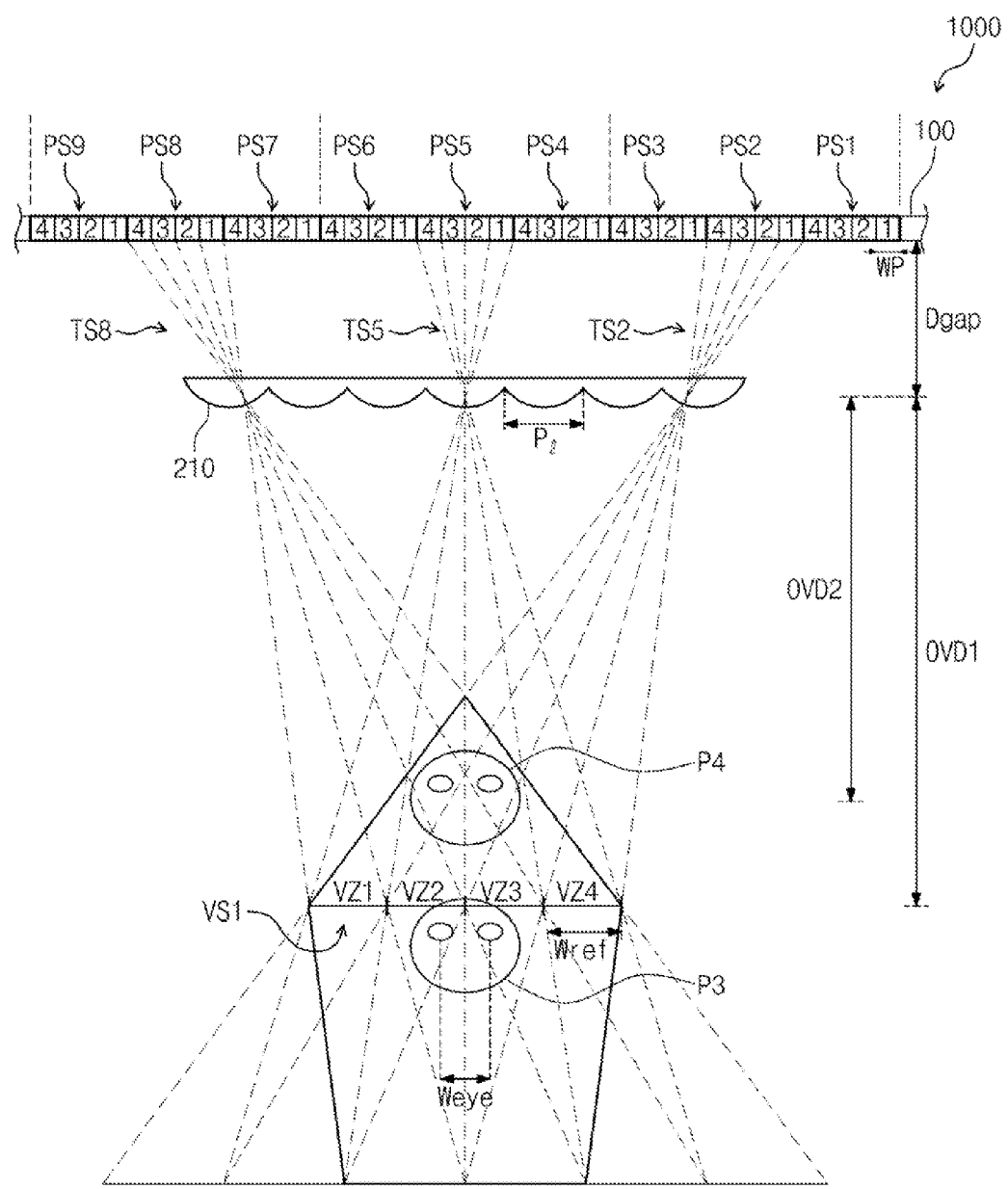
FIG. 4 is a cross-sectional view of an auto-stereoscopic display apparatus that projects a three-dimensional image to viewing zones at a reference visible distance according to an exemplary embodiment of the present disclosure.

FIG. 4 is a cross-sectional view of an auto-stereoscopic display apparatus that projects a three-dimensional image to viewing zones at a reference visible distance according to an exemplary embodiment of the present disclosure.

Referring to FIG. 4, the display unit 100 includes first to ninth pixel sets PS1 to PS9 sequentially arranged in a row. Each of the first to ninth pixel sets PS1 to PS9 includes first to fourth viewpoint pixels 1 to 4 that respectively display the first to fourth viewpoints. The first to ninth pixel sets PS1 to PS9 display viewpoint sets defined by the first to fourth viewpoints through the first to fourth viewpoint pixels 1 to 4. For example, the second pixel set PS2 displays a second viewpoint set TS2, the fifth pixel set PS5 displays a fifth viewpoint set TS5, and the eighth pixel set PS8 displays an eighth viewpoint set TS8.

Viewpoint images of each viewpoint set form corresponding viewpoints. In more detail, the first viewpoint is defined by first viewpoint images of the first to ninth pixel sets PS1 to PS9. Similarly, the second to fourth viewpoints are defined by the second to fourth viewpoint images of the first to ninth pixel sets PS1 to PS9, respectively.

The lenticular lens 210 and the display unit 100 are spaced apart from each other by a gap Dgap. The lenticular lens 210 refracts the viewpoint sets provided from the first to ninth pixel sets PS1 to PS9 and projects the viewpoint sets to the first reference viewing set VS1, spaced apart by the reference visible distance OVD1.

For example, the lenticular lens 210 refracts the second viewpoint set TS2 displayed by the second pixel set PS2 and projects the second viewpoint set TS2 to the first reference viewing set VS1. As a result, the first to fourth viewpoint images of the second pixel set PS2 are projected to the first to fourth viewing zones VZ1 to VZ4. Similarly, the lenticular lens 210 refracts the fifth and eighth viewpoint sets TS5 and TS8 respectively displayed by the fifth and eighth pixel sets PS5 and PS8 and projects the fifth and eighth viewpoint sets TS5 and TS8 to the first reference viewing set VS1. As a result, the first to fourth viewpoint images of the fifth and eighth sets TS5 and TS8 are projected to the first to fourth viewing zones VZ1 to VZ4, respectively.

To allow a user to perceive a three-dimensional image at the reference viewing set VS1, the reference visible distance OVD1, the gap Dgap, a period P1 in the row direction of the lenticular lens 210, a number N of the viewpoints, a width Wp of the pixel are adjusted to satisfy the following Equation 1. In a present exemplary embodiment, the number of viewpoints N is 4.

$$Wp \times N = \frac{P1 \times (OVD1 + Dgap)}{OVD1} \quad \text{Equation 1}$$

A distance Weye between the left and right eyes of the user and a width Wref of each of the first to fourth viewing zones VZ1 to VZ4 satisfy the following Equation 2. In a present exemplary embodiment, the distance Weye is about 65 mm.

$$Wref < Weye \quad \text{Equation 2}$$

In FIG. 4, a third user P3 perceives a three-dimensional image displayed by the display unit 100 at the reference visible distance OVD1, but a fourth user P4 who perceives the image displayed by the display unit 100 at a target visible distance OVD2 shorter than the reference visible distance OVD1 may not perceive the three-dimensional image.

In more detail, the left eye of the third user P3 perceives the second viewpoint in the second viewing zone VZ2 and the right eye of the third user P3 perceives the third viewpoint in the third viewing zone VZ3. However, the left and right eyes of the fourth user P4 perceive different viewpoints from the third to ninth pixel sets PS3 to PS9. For example, the left eye of the fourth user P4 perceives the second viewpoint image from the third pixel set PS3, but perceives the first viewpoint image from the second pixel set PS2. Similarly, the right eye of the fourth user P4 perceives the third viewpoint image from the seventh pixel set PS7, but perceives the fourth viewpoint image from the eighth pixel set PS8.

Figure 5A:
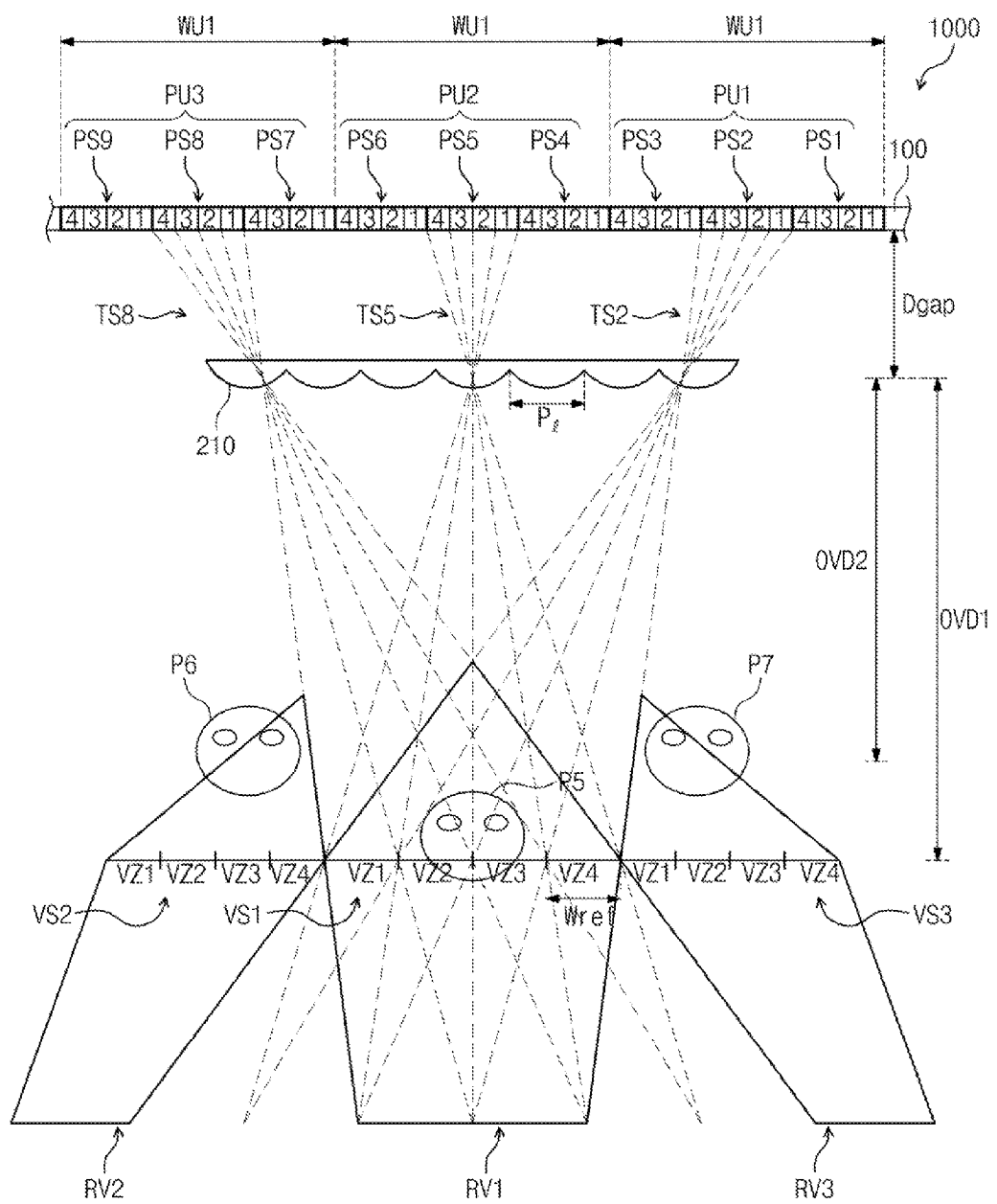
FIGS. 5A and 5B are cross-sectional views that illustrate a method of projecting a three-dimensional view to viewing zones at a target visible distance according to an exemplary embodiment of the present disclosure.
Figure 5B:
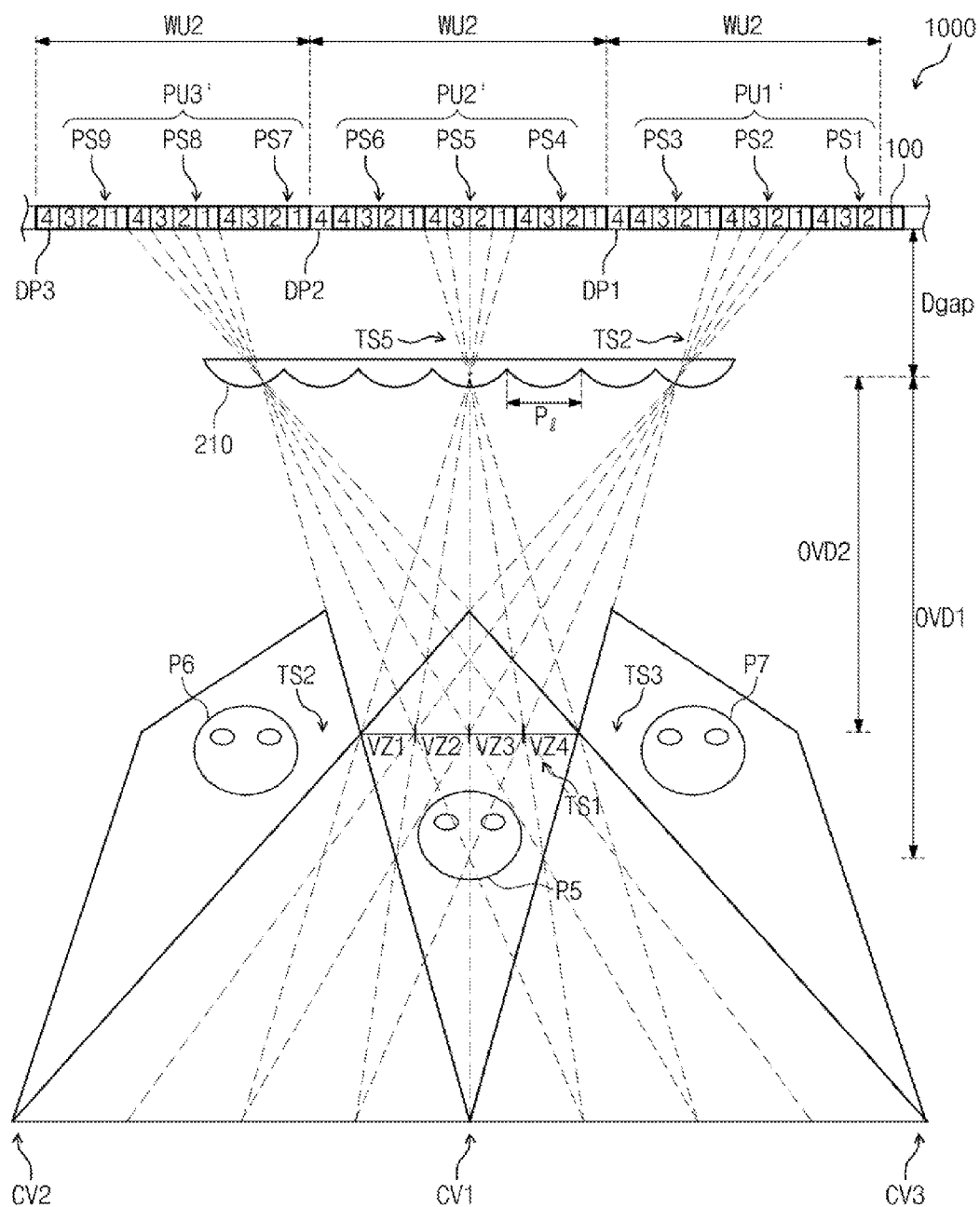

FIGS. 5A and 5B are cross-sectional views that illustrate a method of projecting a three-dimensional view to viewing zones at the target visible distance according to an exemplary embodiment of the present disclosure.

Referring to FIG. 5A, the auto-stereoscopic display apparatus 1000 projects a three-dimensional image to viewing zones at the reference visible distance OVD1 and fifth to seventh users P5 to P7 perceive the image displayed in the display apparatus 1000 at positions different from each other.

A first original normal image area RV1 in which a user perceives a three-dimensional effect may be defined with respect to the reference visible distance OVD1. The first original normal image area RV1 decreases in size with increasing distance from the reference visible distance OVD1. Second and third original normal image areas RV2 and RV3 that respectively correspond to the second and third viewing sets VS2 and VS3 are provided at each side of the first original normal image area RV1. When a user perceives viewpoints that are adjacent to each other but are included in different original normal image areas, the user perceives an abnormal image at a boundary between any two of the first to third original normal image areas RV1 to RV3 respectively through the left and right eyes.

As described above, when the auto-stereoscopic display apparatus 1000 projects a three-dimensional image to viewing zones at the reference visible distance OVD1, a range in which a user can perceive a three-dimensional image from the display unit 100 is determined with reference to the reference visible distance OVD1.

Meanwhile, the fifth to seventh users P5 to P7 perceive the image at a distance less than the reference visible distance OVD1. The fifth user P5 perceives a three-dimensional image in the first original normal image area RV1, but the sixth and seventh users P6 and P7 perceive an abnormal image at the boundary of the second and third original normal image areas RV2 and RV3.

The tracking part 700 (see FIG. 1) detects positions of the fifth to seventh users P5 to P7 and outputs user position information of the fifth to seventh users P5 to P7.

The calculating unit 810 (see FIG. 1) calculates distances between the lenticular lens 210 and the fifth to seventh users P5 to P7 based on the user position information.

Then, the calculating unit 810 calculates the target visible distance OVD2 from the distances between the lenticular lens 210 and the fifth to seventh users P5 to P7. The target visible distance OVD2 may be, but is not limited to, an average value of the distances between the lenticular lens 210 and the fifth to seventh users P5 to P7. Since the fifth to seventh users P5 to P7 are positioned at a distance less than the reference visible distance OVD1, the target visible distance OVD2 may be less than the reference visible distance OVD1.

The calculating unit 810 compares the target visible distance OVD2 and the reference visible distance OVD1 and outputs the comparison result.

The auto-stereoscopic display apparatus 1000 processes signals applied to the display unit 100 on the basis of the comparison result, and thus the fifth to seventh users P5 to P7 perceive an undistorted three-dimensional image.

In more detail, the mapping unit 820 (see FIG. 1) maps the image data Idata (see FIG. 1) on the basis of the comparison result and generates mapped image data Idata' to divide the pixel sets into L original pixel units and convert the original pixel units into compensated pixel units. A method of processing the image data Idata will be described in detail with reference to FIGS. 6 to 8.

Each original pixel unit is defined to include M pixel sets. "M" is a natural number that satisfies the following Equation 3.

$$L+1 > \frac{M \times N(Wref - Wt1)}{Wt1} > L \qquad \text{Equation 3}$$

In Equation 3, "N" denotes the number of viewpoints, "Wref" denotes the width of the viewpoint image projected to the viewing zones at the reference visible distance OVD1, "Wt1" denotes the width of the viewpoint image projected to the viewing zones at the target visible distance OVD2, and "L" denotes the number of the original pixel units. The width Wref of the viewpoint image projected to the reference visible distance OVD1 may be substantially the same as the width of the first to fourth viewing zones VZ1 to VZ4 at the reference visible distance OVD1, and the width Wt1 of the viewpoint image projected to the target visible distance OVD2 may be substantially the same as the width of the fifth to eighth viewing zones VZ5 to VZ8 (see FIG. 5B) at the target visible distance OVD2. Since the target visible distance OVD2 is less than the reference visible distance OVD1, the width Wref of the viewpoint image projected to the reference visible distance OVD1 is greater than the width Wt1 of the viewpoint image projected to the target visible distance OVD2.

As an example, the first to ninth pixel sets PS1 to PS9 may be divided into first to third original pixel units PU1 to PU3. That is, in a present exemplary embodiment, "M" and "L" is each equal to 3. Each of the first to third original pixel units PU1 to PU3 has a first unit width WU1.

Referring to FIG. 5B, the first to third original pixel units PU1 to PU3 (see FIG. 5A) are respectively converted to first to third compensated pixel units PU1' to PU3' each having a second unit width WU2 different from the first unit width WU1. The second unit width WU2 may be greater than the first unit width WU1.

To convert the first to third original pixel units PU1 to PU3 to the first to third compensated pixel units PU1' to PU3', the first to third original pixel units PU1 to PU3 include first to third dummy pixels DP1 to DP3, respectively. Accordingly, the second unit width WU2 is greater than the first unit width WU1 by the width of each of the first to third dummy pixels DP1 to DP3.

In a present exemplary embodiment, the first to third dummy pixels DP1 to DP3 are end portions of the first to third compensated pixel units PU1' to PU3', respectively. Therefore, the first to third dummy pixels DP1 to DP3 are not disposed between pixel sets in the same compensated pixel unit.

In a present exemplary embodiment, each of the first to third dummy pixels DP1 to DP3 may display the same viewpoint image as the viewpoint image displayed by the pixel adjacent thereto. For example, the first dummy pixel DP1 displays the same image as the fourth pixel 4 of the third pixel set PS3, the second dummy pixel DP2 displays the same image as the fourth pixel 4 of the sixth pixel set PS6, and the third dummy pixel DP3 displays the same image as the fourth pixel 4 of the ninth pixel set PS9. Thus, although the first to third dummy pixels DP1 to DP3 are used, the user perceives an undistorted three-dimensional image.

As described above, when the first to third original pixel units PU1 to PU3 are converted to the first to third compensated pixel units PU1' to PU3' each having a second unit width WU2 on the basis of the comparison result, the image displayed in the display unit 100 is refracted by the lenticular lens 210 and projected to a plurality of target viewing sets at the target visible distance OVD2. Here, the target visible distance OVD2 corresponds to the distance between the lenticular lens 210 and the target viewing sets.

The target viewing sets include a first target viewing set VS1 and second and third target viewing sets VS2 and VS3 disposed at each side of the first target viewing set VS1.

The first target viewing set VS1 includes the first to fourth viewing zones VZ1 to VZ4 sequentially arranged in a row. The lenticular lens 210 refracts the first to fourth viewpoints of the image and projects the first to fourth viewpoints to the first to fourth viewing zones VZ1 to VZ4, respectively.

As described above, when each of the first to third compensated pixel units PU1' to PU3' has the second unit width WU2, the first to third original normal image areas RV1 to RV3 (see FIG. 5A) corresponding to the first to third original pixel units PU1 to PU3 are converted to first to third compensated normal image areas CV1 to CV3, respectively. The first to third compensated normal image areas CV1 to CV3 respectively correspond to the first to third target viewing sets VS1 to VS3. The width of the first to third compensated normal image areas CV1 to CV3 at the target visible distance OVD2 is greater than the width of the first to third original normal image areas RV1 to RV3 at the target visible distance OVD2.

As described with reference to FIG. 5A, when the auto-stereoscopic display apparatus 1000 provides the first to third original normal image areas RV1 to RV3, the sixth and seventh users P6 and P7 perceive an abnormal image, but the sixth and seventh users P6 and P7, together with the fifth user P5, perceive a three-dimensional image when the auto-stereoscopic display apparatus 1000 provides the first to third compensated normal image areas CV1 to CV3. That is, the visible distance changes depending on the positions of the users, and a viewing distance and a viewing range of the auto-stereoscopic display apparatus 1000 may be broadened.

Figure 6:
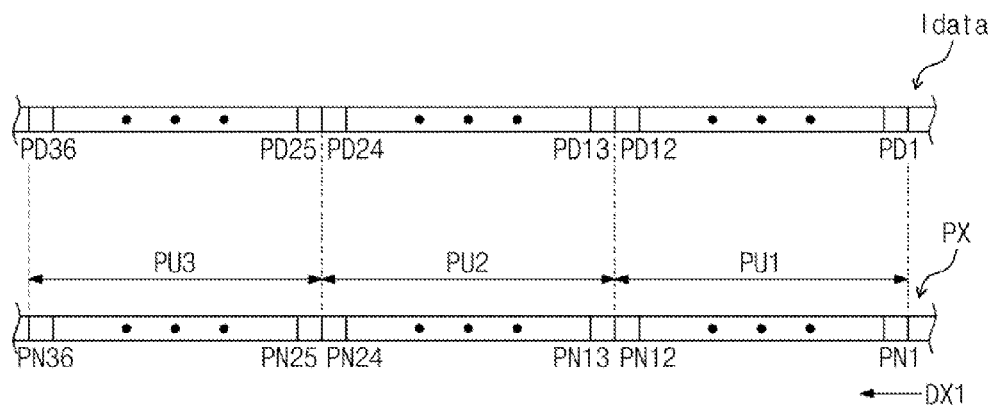
FIG. 6 is a cross-sectional view of a display unit that projects a three-dimensional image to viewing zones at a reference visible distance according to an exemplary embodiment of the present disclosure.

FIG. 6 is a cross-sectional view of a display unit that projects a three-dimensional image to viewing zones at the reference visible distance according to an exemplary embodiment of the present disclosure.

Hereinafter, an operation of the auto-stereoscopic display apparatus 1000 will be described in detail with reference to FIGS. 1, 5A, and 6 when a three-dimensional image is projected at the reference visible distance OVD1.

When the auto-stereoscopic display apparatus 1000 projects the three-dimensional image at the reference visible distance OVD1, the mapping unit 800 is not operated and the data driver 400 converts the image data Idata provided from the timing controller 500 to data voltages and applies the data voltages to the display unit 100. The display unit 100 includes pixels PX arranged in a row. For the convenience of explanation, the pixels PX are arranged in a first direction DX1 substantially parallel to the row direction and are referred to as first to thirty-sixth pixels PN1 to PN36.

The image data Idata includes first to thirty-sixth pixel data PD1 to PD36 sequentially received from the timing controller 500. The first to thirty-sixth pixel data PD1 to PD36 respectively correspond to the first to thirty-sixth pixels PN1 to PN36. In more detail, the first to thirty-sixth pixel data PD1 to PD36 are supplied to the data driver 400, the data driver 400 sequentially supplies first to thirty-sixth data voltages respectively corresponding to the first to thirty-sixth pixels PN1 to PN36 to the first to thirty-sixth pixels PN1 to PN36, and the first to thirty-sixth pixels PN1 to PN36 display the image in response to the first to thirty-sixth data voltages to project the three-dimensional image to the viewing zones at the reference visible distance OVD1.

In this case, the first original pixel unit PU1 includes the first to twelfth pixels PN1 to PN12, the second original pixel unit PU2 includes the thirteenth to twenty-fourth pixels PN13 to PN24, and the third original pixel unit PU3 includes the twenty-fifth to thirty-sixth pixels PN25 to PN36.

Figure 7:
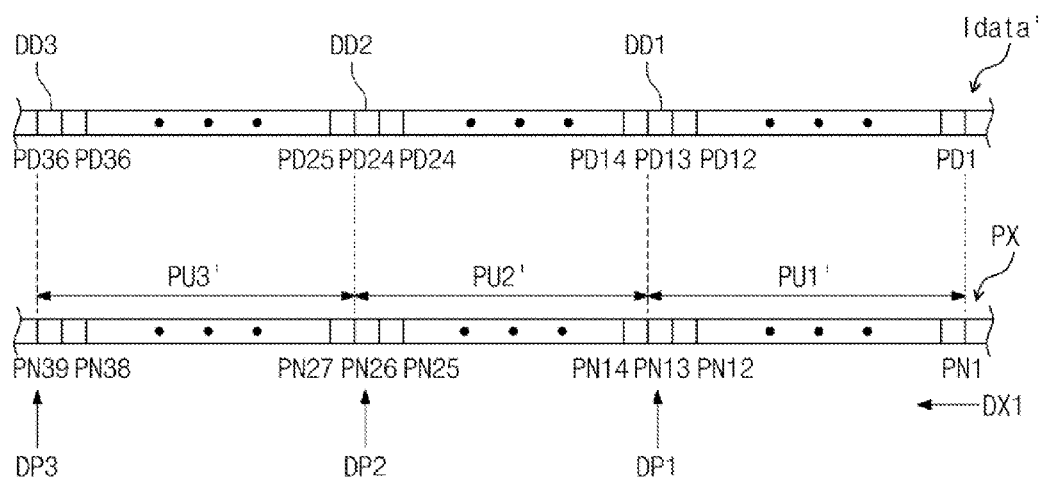
FIG. 7 is a cross-sectional view of a display unit that projects a three-dimensional image to viewing zones at a target visible distance according to an exemplary embodiment of the present disclosure.
Figure 8:
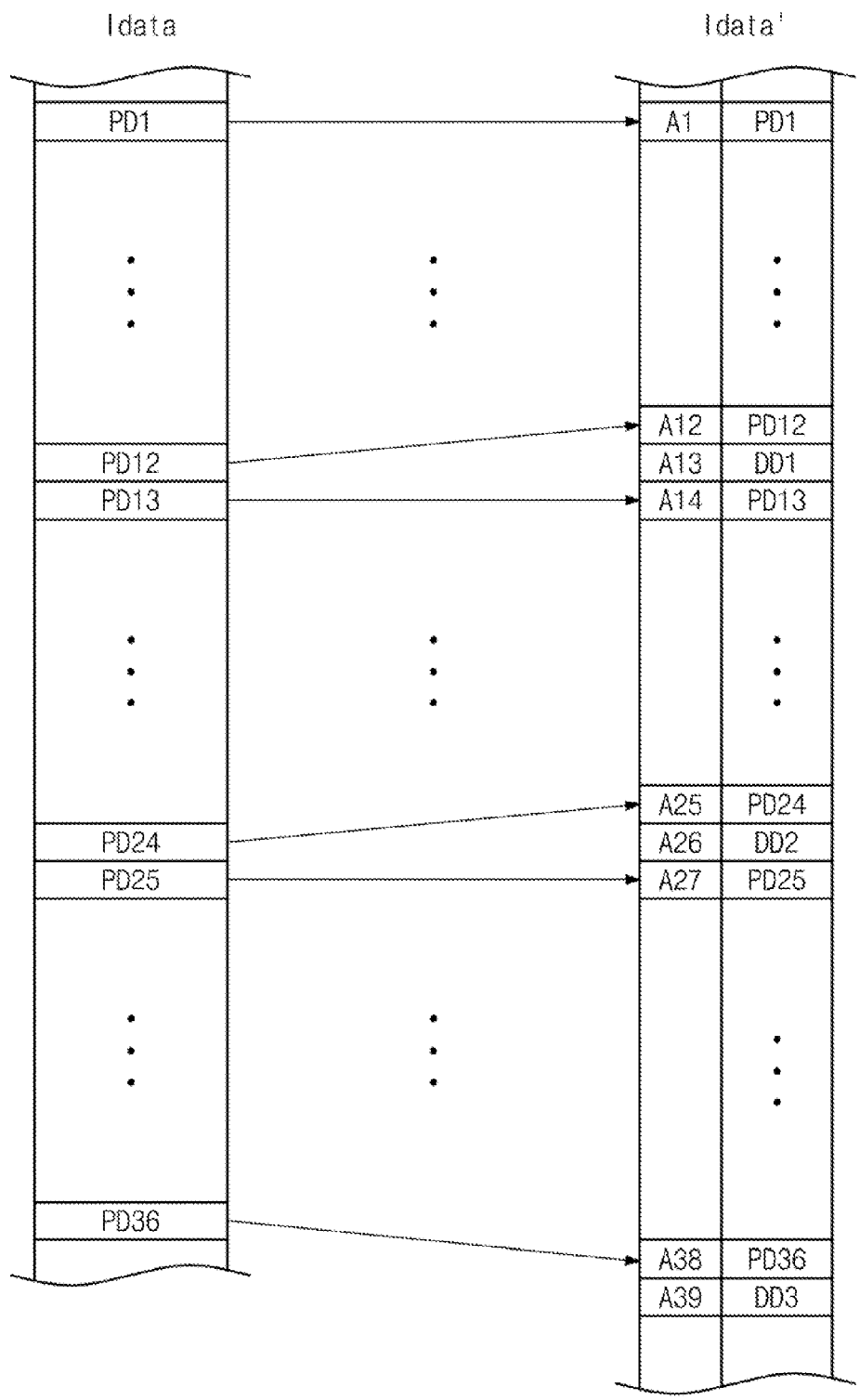
FIG. 8 illustrates a process of generating mapping image data shown in FIG. 7.

FIG. 7 is a cross-sectional view of a display unit that projects a three-dimensional image to the viewing zones at the target visible distance according to an exemplary embodiment of the present disclosure and FIG. 8 illustrates a process of generating the mapping image data shown in FIG. 7.

Hereinafter, the operation of the auto-stereoscopic display apparatus 1000 will be described in detail with reference to FIGS. 1, 5B, 7, and 8 when a three-dimensional image is projected to the viewing zones at the target visible distance OVD2.

The mapping unit 820 maps the image data Idata on the basis of the comparison result and outputs the mapping image data Idata'. In more detail, the mapping unit 820 writes the first to twelfth pixel data PD1 to PD12 in first to twelfth addresses A1 to A12 and writes a first dummy pixel data DD1 in a thirteenth address A13.

Then, the mapping unit 820 writes the thirteenth to twenty-fourth pixel data PD13 to PD24 in fourteenth to twenty-fifth addresses A14 to A25 and writes a second dummy pixel data DD2 in a twenty-sixth address A26.

The mapping unit 820 writes the twenty-fifth to thirty-sixth pixel data PD25 to PD36 in twenty-seventh to thirty-eighth addresses A27 to A38 and writes a third dummy pixel data DD3 in a thirty-ninth address A39.

The data written in the first to thirty-sixth addresses A1 to A39 of the mapping image data Idata' sequentially correspond to the first to thirty-ninth pixels PN1 to PN39. In more detail, the mapping image data Idata' are sequentially supplied to the data driver 400, the data driver 400 sequentially supplies the first to thirty-ninth data voltages corresponding to the mapping image data Idata' to the first to thirty-ninth pixels PN1 to PN39, and the first to thirty-ninth pixels PN1 to PN39 display the image in response to the first to thirty-ninth data voltages to project the three-dimensional image to the viewing zones at the target visible distance OVD2.

For example, the first to thirteenth pixels PN1 to PN13 of the first compensated pixel unit PU1' receive the data voltages converted from the first to twelfth pixel data PD1 to PD12 and the first dummy pixel data DD1 written in the first to thirteenth addresses A1 to A13 and display the image corresponding to the first to twelfth pixel data PD1 to PD12 and the data voltages.

As a result, the first compensated pixel unit PU1' includes the first to thirteenth pixels PN1 to PN13, the second compensated pixel unit PU2' includes the fourteenth to twenty-sixth pixels PN14 to PN26, and the third compensated pixel unit PU3' includes the twenty-seventh pixel to thirty-ninth pixels PN27 to PN39. In this case, the thirteenth, twenty-sixth, and thirty-ninth pixels PN13, PN26, and PN39 may be the first, second, and third dummy pixels DD1, DD2, and DD3, respectively.

Each of the first to third dummy pixel data DD1 to DD3 may be substantially the same as the pixel data written in the addresses adjacent thereto. In more detail, the first dummy pixel data DD1 may be the same as the twelfth or thirteenth pixel data PD12 and PD13 respectively written in the twelfth and fourteenth addresses A12 and A14. Similarly, the second dummy pixel data DD2 may be the same as the twenty-fourth or twenty-fifth pixel data PD24 and PD25 respectively written in the twenty-fifth and twenty-seventh addresses A25 and A27, and the third dummy pixel data DD3 may be the same as the thirty-sixth pixel data PD36 written in the thirty-eighth address A38. In a present exemplary embodiment, the first dummy pixel data DD1 is the twelfth pixel data PD12, the second dummy pixel data DD2 is the twenty-fourth pixel data PD24, and the third dummy pixel data DD3 is the thirty-sixth pixel data PD36. Accordingly, each of the first to third dummy pixels DD1 to DD3 may display the same image as that of the pixel adjacent thereto.

Figure 9A:
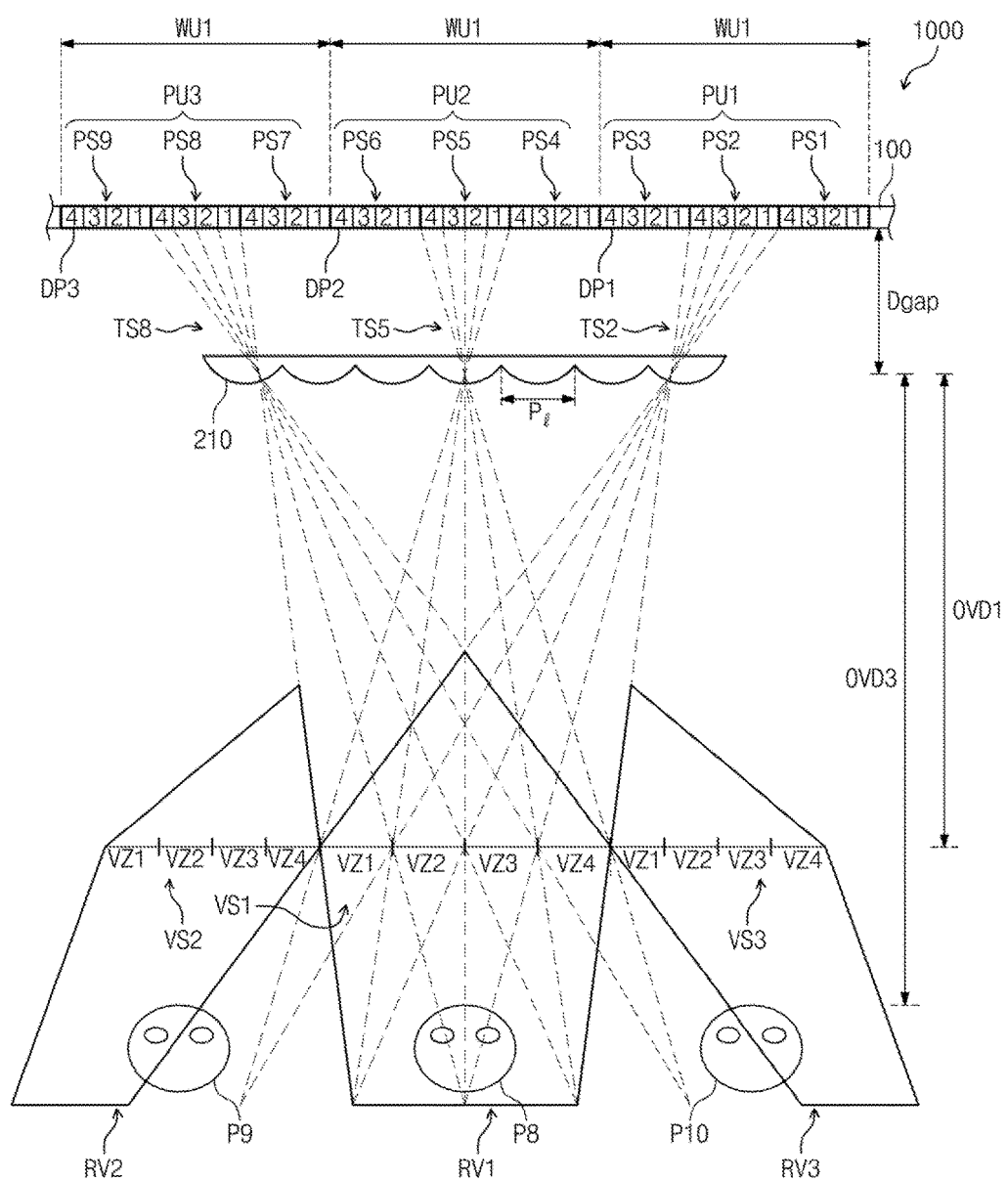
FIGS. 9A and 9B are cross-sectional views that illustrate a method of projecting a three-dimensional image to viewing zones at a target visible distance according to an exemplary embodiment of the present disclosure.
Figure 9B:
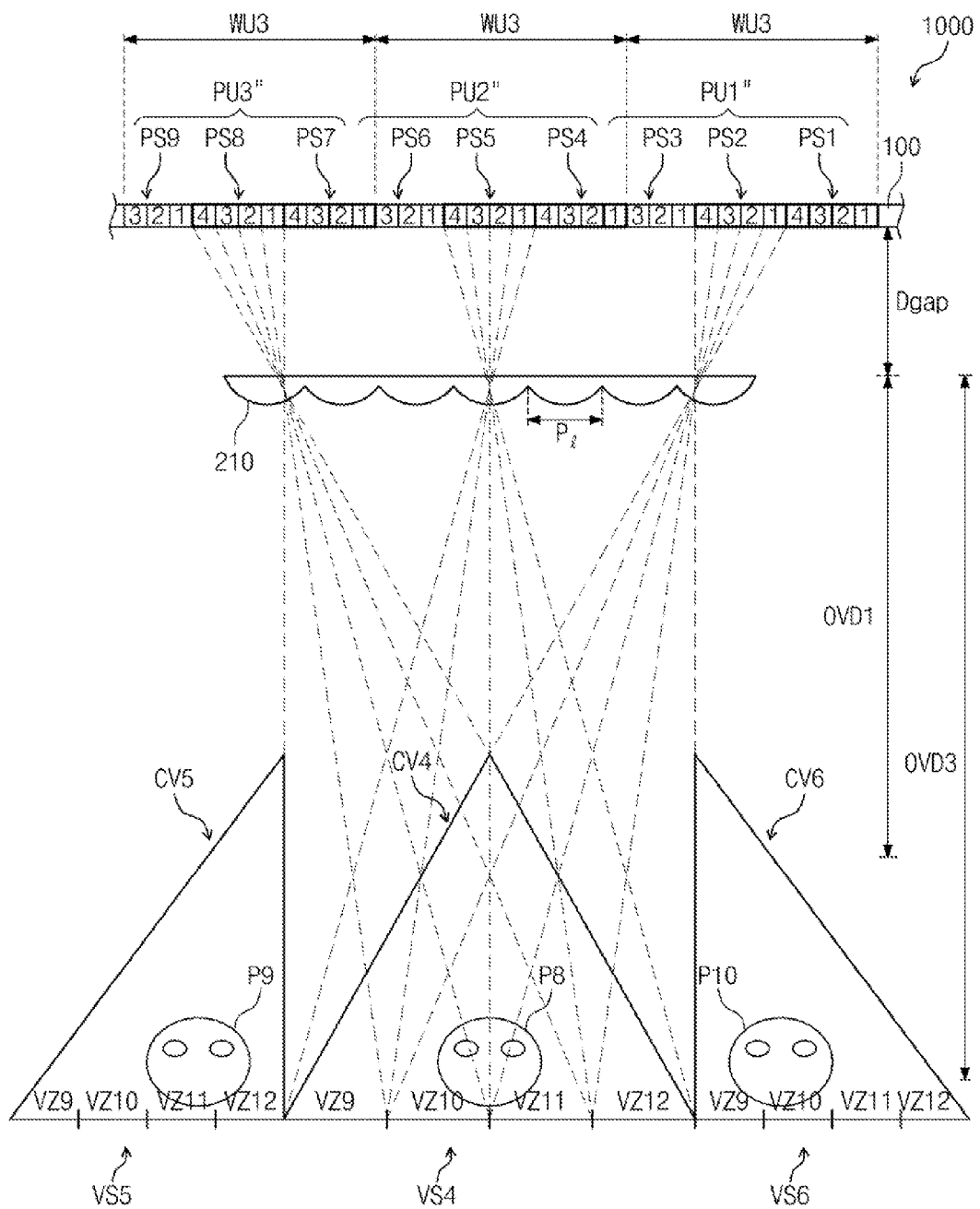

FIGS. 9A and 9B are cross-sectional views of a method of projecting a three-dimensional image to the viewing zones at the target visible distance according to an exemplary embodiment of the present disclosure.

Referring to FIGS. 9A and 9B, the auto-stereoscopic display apparatus 1000 projects a three-dimensional image to the viewing zones at the reference visible distance OVD1 and eighth to tenth users P8 to P10 at different positions from each other. perceive an image displayed in the display apparatus 1000 The eighth to tenth users P8 to P10 perceive the image at a distance greater than the reference visible distance OVD1. The eighth user P8 perceives a three-dimensional image in the first original normal image area RV1, but the ninth and tenth users P9 and P10 perceive an abnormal image at the boundary of the second and third original normal image areas RV2 and RV3.

The tracking part 700 (see FIG. 1) detects positions of the eighth to tenth users P8 to P10 and outputs the positions of the eighth to tenth users P8 to P10.

The calculating unit 810 (see FIG. 1) calculates distances between the lenticular lens 210 and the eighth to tenth users P8 to P10 based on the user position information.

Then, the calculating unit 810 calculates a target visible distance OVD3 from the distances between the lenticular lens 210 and the eighth to tenth users P8 to P10. The target visible distance OVD2 may be, but is not limited to, an average value of the distances between the lenticular lens 210 and the eighth to tenth users P8 to P10. Since the eighth to tenth users P8 to P10 are positioned at a distance greater than the reference visible distance OVD1, the target visible distance OVD3 is greater than the reference visible distance OVD1.

The calculating unit 810 compares the target visible distance OVD3 and the reference visible distance OVD1 and outputs a comparison result.

The auto-stereoscopic display apparatus 1000 processes signals supplied to the display unit 100 on the basis of the comparison result, and thus the eighth to tenth users P8 to P10 perceive an undistorted three-dimensional image.

In more detail, the mapping unit 820 (see FIG. 1) maps the image data Idata (see FIG. 1) on the basis of the comparison result and generates the mapped image data Idata' to divide the pixel sets into L original pixel units and convert the original pixel units to compensated pixel units. The method of processing the image data Idata will be described in detail with reference to FIGS. 10 to 12.

Each original pixel unit is defined to include M pixel sets. "M" is a natural number that satisfies the following Equation 4.

$$L+1 > \frac{M \times N(Wt2 - Wref)}{Wt2} > L \quad \text{Equation 4}$$

In Equation 4, "N" denotes the number of viewpoints, "Wref" denotes the width of the viewpoint image projected to the viewing zones at the reference visible distance OVD1, "Wt2" denotes the width of the viewpoint image projected to the viewing zones at the target visible distance OVD3, and "L" denotes the number of the original pixel units. The width Wref of the viewpoint image projected to the viewing zones at the reference visible distance OVD1 may be substantially the same as the width of the first to fourth viewing zones VZ1 to VZ4 at the reference visible distance OVD1, and the width Wt2 of the viewpoint image projected to the viewing zones at the target visible distance OVD3 may be substantially the same as the width of the ninth to twelfth viewing zones VZ9 to VZ12 (see FIG. 9B) at the target visible distance OVD3. Since the reference visible distance OVD1 is less than the target visible distance OVD3, the width Wref of the viewpoint image projected to the viewing zones at the reference visible distance OVD1 is less than the width Wt2 of the viewpoint image projected to the viewing zones at the target visible distance OVD3.

As an example, the first to ninth pixel sets PS1 to PS9 may be divided into first to third original pixel units PU1 to PU3. That is, in the present exemplary embodiment, each of "M" and "L" is 3. Each of the first to third original pixel units PU1 to PU3 has a first unit width WU1.

The first to third original pixel units PU1 to PU3 are respectively converted to first to third compensated pixel units PU1 "to PU3" each having a third unit width WU3 different from the first unit width WU1. The third unit width WU3 may be greater than the first unit width WU1.

To convert the first to third original pixel units PU1 to PU3 to the first to third compensated pixel units PU1" to PU3", a pixel in each of the first to third original pixel units PU1 to PU3 are defined to be first to third dummy pixels DP1 to DP3 and are subsequently excluded from the first to third original pixel units PU1 to PU3. Accordingly, the third unit width WU3 becomes narrower than the first unit width WU1 by the width of each of the first to third dummy pixels DP1 to DP3.

In a present exemplary embodiment, the first to third dummy pixels DP1 to DP3 are defined as the pixels respectively provided to end portions of the first to third compensated pixel units PU1" to PU3".

For example, a fourth pixel 4 of the third pixel set PS3 of the first original pixel unit PU1 is designated as the first dummy pixel DP1 and excluded from the first original pixel unit PU1. A fourth pixel 4 of the sixth pixel set PS6 of the second original pixel unit PU2 is designated as the second dummy pixel DP2 and excluded from the second original pixel unit PU2. A fourth pixel 4 of the ninth pixel set PS9 of the third original pixel unit PU3 is designated as the third dummy pixel DP3 and excluded from the third original pixel unit PU3.

As described above, when the first to third original pixel units PU1 to PU3 are converted to the first to third compensated pixel units PU1" to PU3" each having a third unit width WU3 on the basis of the comparison result, the image displayed in the display unit 100 is refracted by the lenticular lens 210 and projected to a plurality of target viewing sets at the target visible distance OVD3. Here, the target visible distance OVD3 corresponds to the distance between the lenticular lens 210 and the target viewing sets.

The target viewing sets include a fourth target viewing set VS4 and fifth and sixth target viewing sets VS5 and VS6 disposed at each side of the fourth target viewing set VS4.

The fourth target viewing set VS4 includes the ninth to twelfth viewing zones VZ9 to VZ12 sequentially arranged in a row. The lenticular lens 210 refracts the first to fourth viewpoints of the image and projects the first to fourth viewpoints to the ninth to twelfth viewing zones VZ9 to VZ12, respectively.

As described above, when each of the first to third compensated pixel units PU1" to PU3" has a third unit width WU3, the first to third original normal image areas RV1 to RV3 corresponding to the first to third original pixel units PU1 to PU3 are converted to fourth to sixth compensated normal image areas CV4 to CV6, respectively. The fourth to sixth compensated normal image areas CV4 to CV6 respectively correspond to the fourth to sixth target viewing sets VS4 to VS6. The width of the fourth to sixth compensated normal image areas CV4 to CV6 at the target visible distance OVD3 is greater than the width of the first to third original normal image areas RV1 to RV3 at the target visible distance OVD3. Accordingly, as described with reference to FIG. 9A, when the auto-stereoscopic display apparatus 1000 projects a three-dimensional image to the first to third original normal image areas RV1 to RV3, the ninth and tenth users P9 and P10 perceive an abnormal image, but the ninth and tenth users P9 and P10 together with the eighth user P8 perceive a three-dimensional image when the auto-stereoscopic display apparatus 1000 projects a three-dimensional image to the fourth to sixth compensated normal image areas CV1 to CV3.

Figure 10:
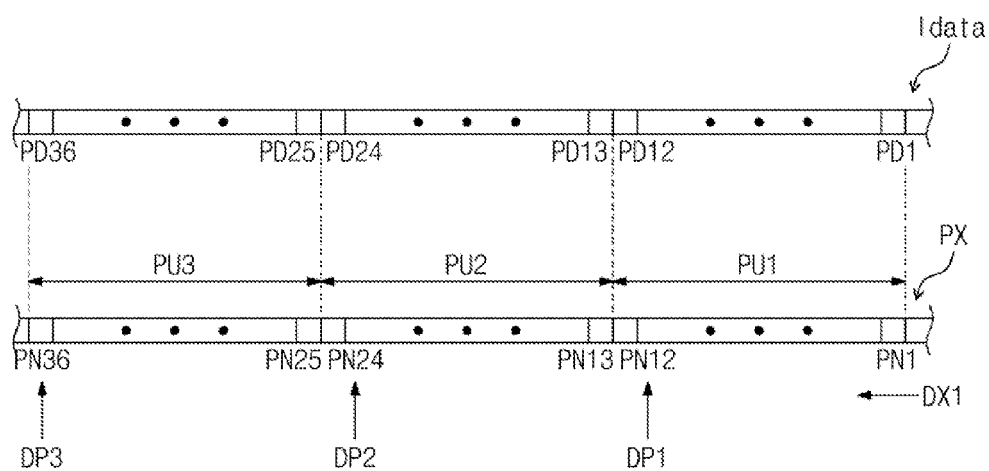
FIG. 10 is a cross-sectional view of a display unit that projects a three-dimensional image to viewing zones at a reference visible distance according to an exemplary embodiment of the present disclosure.

FIG. 10 is a cross-sectional view of the display unit that projects the three-dimensional image to the viewing zones at the reference visible distance according to an exemplary embodiment of the present disclosure.

Hereinafter, the operation of the auto-stereoscopic display apparatus 1000 will be described in detail with reference to FIGS. 1, 9A, and 10 when the three-dimensional image is projected to the viewing zones at the reference visible distance OVD1.

When the auto-stereoscopic display apparatus 1000 projects the three-dimensional image to the viewing zones at the reference visible distance OVD1, the mapping unit 800 is not operated and the data driver 400 converts the image data Idata provided from the timing controller 500 to data voltages and applies the data voltages to the display unit 100. The display unit 100 includes the pixels PX arranged in a row. For the convenience of explanation, the pixels PX are arranged in the first direction DX1 substantially parallel to the row direction and are referred to as first to thirty-sixth pixels PN1 to PN36.

The image data Idata includes first to thirty-sixth pixel data PD1 to PD36 sequentially received from the timing controller 500. The first to thirty-sixth pixel data PD1 to PD36 respectively correspond to the first to thirty-sixth pixels PN1 to PN36. In more detail, the first to thirty-sixth pixel data PD1 to PD36 are supplied to the data driver 400, the data driver 400 sequentially supplies first to thirty-sixth data voltages respectively corresponding to the first to thirty-sixth pixels PN1 to PN36 to the first to thirty-sixth pixels PN1 to PN36, and the first to thirty-sixth pixels PN1 to PN36 display the image in response to the first to thirty-sixth data voltages to project the three-dimensional image to the viewing zones at the reference visible distance OVD1.

In this case, the first original pixel unit PU1 includes the first to twelfth pixels PN1 to PN12, the second original pixel unit PU2 includes the thirteenth to twenty-fourth pixels PN13 to PN24, and the third original pixel unit PU3 includes the twenty-fifth to thirty-sixth pixels PN25 to PN36.

The mapping unit 820 designates the first to third dummy pixels DP1 to DP3 on the basis of the comparison result. For example, the mapping unit 820 may designate the twelfth, twenty-fourth, and thirty-sixth pixels as the first, second, and third dummy pixels DP1, DP2, and PD3, respectively.

Figure 11:
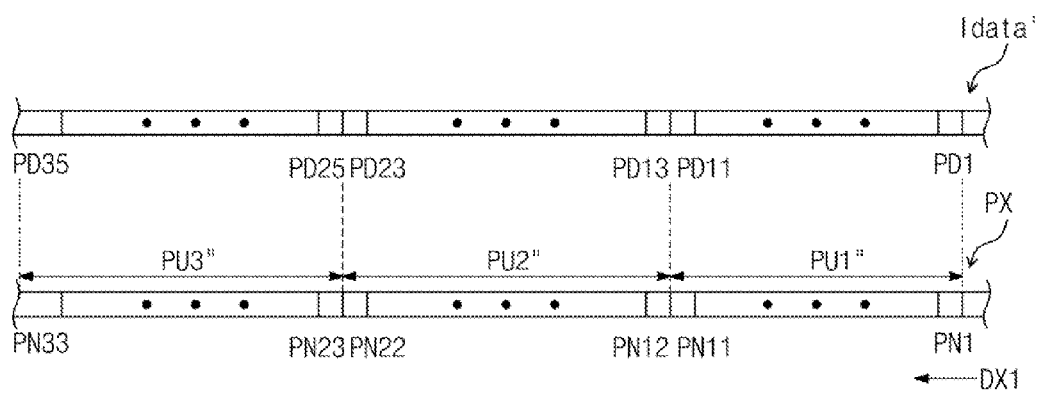
FIG. 11 is a cross-sectional view of a display unit that projects a three-dimensional image to viewing zones at a target visible distance according to an exemplary embodiment of the present disclosure.
Figure 12:
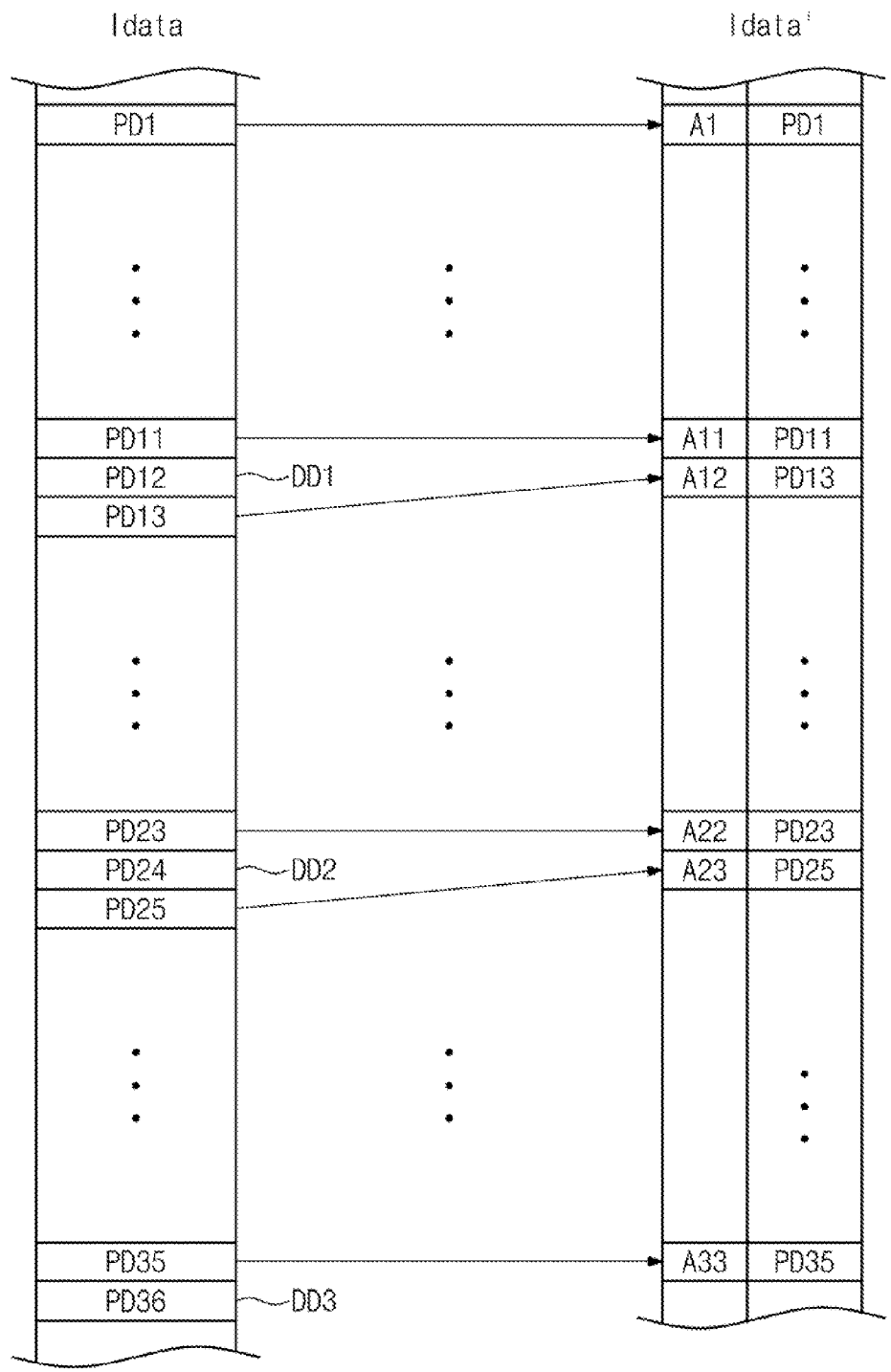
FIG. 12 illustrates a process of generating mapping image data shown in FIG. 11.

FIG. 11 is a cross-sectional view of a display unit that projects a three-dimensional image to the viewing zones at the target visible distance according to an exemplary embodiment of the present disclosure and FIG. 12 illustrates a process of generating mapping image data shown in FIG. 11.

Hereinafter, the operation of the auto-stereoscopic display apparatus 1000 will be described in detail with reference to FIGS. 1, 9B, 10, and 11 when the three-dimensional image is projected to the viewing zones at the target visible distance OVD3.

The mapping unit 820 maps the image data Idata on the basis of the comparison result and outputs the mapping image data Idata'.

In more detail, the mapping unit 820 designates the first to third dummy pixel data DD1 to DD3 among the image data Idata and removes the first to third dummy pixel data DD1 to DD3 from the image data Idata to generate the mapping image data Idata'. In a present exemplary embodiment, the first dummy pixel data DD1 is the twelfth pixel data PD12, the second dummy pixel data DD2 is the twenty-fourth pixel data PD24, and the third dummy pixel data DD3 is the thirty-sixth pixel data PD36.

To this end, the mapping unit 820 writes the first to eleventh pixel data PD1 to PD11 in first to eleventh addresses A1 to A11 and does not write the twelfth pixel data PD12 that corresponds to the first dummy pixel data DP1 in the mapping image data Idata'.

Then, the mapping unit 820 writes the thirteenth to twenty-third pixel data PD13 to PD23 in twelfth to twenty-second addresses A1 to A22 and does not write the twenty-fourth pixel data PD24 that corresponds to the second dummy pixel DP2 in the mapping image data Idata'.

The mapping unit 820 writes the twenty-fifth to thirty-fifth pixel data PD25 to PD35 in twenty-third to thirty-third addresses A23 to A33 and does not write the thirty-sixth pixel data PD36 that corresponds to the third dummy pixel DP3 in the mapping image data Idata'.

The data written in the first to thirty-third addresses A1 to A33 of the mapping image data Idata' sequentially correspond to the first to thirty-third pixels PN1 to PN33. In more detail, the mapping image data Idata' are sequentially supplied to the data driver 400, the data driver 400 sequentially supplies the first to thirty-third data voltages corresponding to the mapping image data Idata' to the first to thirty-third pixels PN1 to PN33, and the first to thirty-third pixels PN1 to PN33 display the image in response to the first to thirty-third data voltages to project the three-dimensional image to the viewing zones at the target visible distance OVD3.

As a result, the first to eleventh pixels PN1 to PN11 of the first compensated pixel unit PU1" receive the data voltages converted by the first to eleventh pixel data PD1 to PD11 written in the first to eleventh addresses A1 to A11 and display the image corresponding to the data voltages.

In addition, the twelfth to twenty-second pixels PN12 to PN22 of the second compensated pixel unit PUT' receive the data voltages converted by the thirteenth to twenty-third pixel data PD13 to PD23 written in the twelfth to twenty-second addresses A12 to A22 and display the image corresponding to the data voltages.

Further, the twenty-third to thirty-third pixels PN23 to PN33 of the third compensated pixel unit PU3" receive the data voltages converted by the twenty-fifth to thirty-fifth pixel data PD25 to PD35 written in the twenty-third to thirty-third addresses A23 to A33 and display the image corresponding to the data voltages.

Although exemplary embodiments of the present disclosure have been described, it is understood that embodiments of the present disclosure should not be limited to these exemplary embodiments but various changes and modifications can be made by one ordinary skilled in the art within the spirit and scope of embodiments of the present disclosure as hereinafter claimed.

What is claimed is:

1. A method of driving an auto-stereoscopic display apparatus, comprising:
  detecting a position of a user to determine a target visible distance;
  determining at least one original pixel unit having a first unit width based on the target visible distance, wherein the pixel unit includes a plurality of pixel sets in a row, each pixel set including N pixels;

comparing the target visible distance to a predetermined reference visible distance of the auto-stereoscopic display apparatus;

converting the original pixel unit to a compensated pixel unit having a second unit width different from the first unit width without changing a width of each of the pixel sets, wherein a difference in width corresponds to an integer multiple of one pixel; and projecting viewpoint sets through the N pixels to a viewing zone at the target visible distance, wherein the target visible distance is less than the reference visible distance and the second unit width is greater than the first unit width, and wherein M is a number of the pixel sets included in the original pixel unit, L is a number of the original pixel units, and M and L are each a natural number satisfying $$L+1 > \frac{M \times N(W_{ref} - W_t)}{W_t} > L,$$

where "N" denotes a number of the viewpoints, "Wref" denotes a width of the viewpoint image projected at the reference visible distance, and "Wt" denotes a width of the viewpoint image projected to the viewing zone at the target visible distance.

2. The method of claim 1, wherein the target visible distance corresponds to an average of distances between the display unit and a plurality of users.

3. The method of claim 1, wherein the compensated pixel unit comprises a dummy pixel and the second unit width is greater than the first unit width by a width of the dummy pixel.

4. The method of claim 3, wherein the dummy pixel is disposed at an end portion of the compensated pixel unit and displays a same image as an image displayed by a pixel disposed adjacent thereto.

5. A method of driving an auto-stereoscopic display apparatus, comprising:

detecting a position of a user to determine a target visible distance;

determining at least one original pixel unit having a first unit width based on the target visible distance, wherein the pixel unit includes a plurality of pixel sets in a row, each pixel set including N pixels;

comparing the target visible distance to redetermined reference visible distance of the auto-stereoscopic display apparatus;

converting the original pixel unit to a compensated pixel unit having a second unit width different from the first unit width without changing a width of each of the pixel sets, wherein a difference in width corresponds to an integer multiple of one pixel; and projecting viewpoint sets through the N pixels to a viewing zone at the target visible distance, wherein the target visible distance is greater than the reference visible distance and the second unit width is less than the first unit width, and wherein M is a number of the pixel sets included in the original pixel unit, L is a number of the original pixel units, and M and L are each a natural number satisfying $$L+1 > \frac{M \times N(W_t - W_{ref})}{W_t} > L,$$

where "N" denotes a number of the viewpoints, "Wref" denotes a width of the view point image projected at the reference visible distance, and "Wt" denotes a width of the viewpoint image projected to the viewing zone at the target visible distance.

6. The method of claim 5, further comprising defining one of the pixels of the original pixel unit as a dummy pixel, and excluding the dummy pixel from the compensated pixel unit such that the second unit width becomes narrower than the first unit width by a width of the dummy pixel.

7. The method of claim 6, wherein the dummy pixel is disposed at an end portion of the original pixel unit.

8. The method of claim 5, wherein the target visible distance corresponds to an average of distances between the display unit and a plurality of users.

9. An auto-stereoscopic display apparatus comprising:

a display unit that includes a plurality of original pixel units, each original pixel unit including a plurality of pixel sets arranged in a row, each pixel set including N pixels, wherein the pixel sets are configured to display viewpoint sets that include N viewpoint images through the N pixels;

a multi-viewpoint forming unit that faces the display unit that is configured to project the viewing sets to a plurality of viewing zones;

a timing controller configured to output image data that includes pixel data corresponding to the pixels;

a tracking part configured to detect a position of a user and to output a user position information; and a mapping part that includes a calculating unit configured to determine a target visible distance of the user based on the user position information and to compare the target visible distance to a reference visible distance to output a comparison result, and a mapping unit configured to receive the image data and the comparison result and to convert the original pixel unit to a compensated pixel unit having a width different from that of the original pixel unit without changing a width of each of the pixel sets, wherein a difference in width corresponds to an integer multiple of one pixel, wherein the target visible distance is less than the reference visible distance, and wherein M is a number of the pixel sets included in the original pixel unit, L is a number of the original pixel units, and M and L are each a natural number that satisfies $$L+1 > \frac{M \times N(W_{ref} - W_t)}{W_t} > L,$$

wherein "Wref" denotes a width of the viewpoint image projected at the reference visible distance and "Wt" denotes a width of the viewpoint image projected at the target visible distance.

10. The auto-stereoscopic display apparatus of claim 9, wherein the mapping unit inserts a dummy pixel data into the image data on the basis of the comparison result to convert the original pixel unit to the compensated pixel unit, wherein the width of the compensated pixel unit is greater than the width of the original pixel unit by a width of the dummy pixel.

11. An auto-stereoscopic display apparatus comprising:

a display unit that includes a plurality of original pixel units, each original pixel unit including a plurality of pixel sets arranged in a row, each pixel set including N pixels, wherein the pixel sets are configured to display viewpoint sets that include N viewpoint images through the N pixels;
a multi-viewpoint forming unit that faces the display unit that is configured to project the viewing sets to a plurality of viewing zones;
a timing controller configured to output image data that includes pixel data corresponding to the pixels;
a tracking part configured to detect a position of a user and to output a user position information; and
a mapping part that includes a calculating nit configured to determine a target visible distance of the user based on the user position information and to compare the target visible distance to a reference visible distance to output a comparison result, and a mapping unit configured to receive the image data and the comparison result and to convert the original pixel unit to a compensated pixel unit having width different from that of the original pixel unit without changing a width of each of the pixel sets, wherein a difference in width corresponds to an integer multiple of one pixel,
wherein the target visible distance is greater than the reference visible distance, and
wherein M is a number of the pixel sets included in the original pixel unit, L is a number of the original pixel units,
and M and L are each a natural number that satisfies $$L+1 > \frac{M \times N(W_t - W_{ref})}{W_t} > L,$$

wherein "Wref" denotes a width of the viewpoint image projected at the reference visible distance and "Wt" denotes a width of the viewpoint image projected at the target visible distance.

12. The auto-stereoscopic display apparatus of claim 11, wherein the mapping unit defines one of the pixels of the original pixel unit as a dummy pixel, and excludes the dummy pixel from the compensated pixel unit such that the width of the compensated pixel unit becomes less than the width of the original pixel unit by a width of the dummy pixel.

13. An auto-stereoscopic display apparatus comprising:
a display unit that includes a plurality of original pixel units, each original pixel unit including a plurality of pixel sets arranged in a row, each pixel set including N pixels, wherein the pixel sets are configured to display viewpoint sets that include N viewpoint images through the N pixels;
a tracking part configured to detect a position of a user and to output a user position information; and
a mapping part that includes a calculating unit configured to determine a target visible distance of the user based on the user position information and to compare the target visible distance to a reference visible distance to output a comparison result, and a mapping unit configured to receive the image data and the comparison result and to convert the original pixel unit to a compensated pixel unit having a width different from that of the original pixel unit,
wherein M is a number of the pixel sets included in the original pixel unit, L is a number of the original pixel units, and M and L are each a natural number that satisfies $$L+1 > \frac{M \times N|W_{ref} - W_t|}{W_t} > L,$$

wherein "Wref" denotes a width of the viewpoint image projected to the reference visible distance and "Wt" denotes a width of the viewpoint image projected to a plurality of viewing zones at the target visible distance.

14. The auto-stereoscopic display apparatus of claim 13, wherein the target visible distance is less than the reference visible distance, the compensated pixel unit comprises a dummy pixel, and a width of the compensated pixel unit is greater than a width of the original pixel unit by a width of the dummy pixel.

15. The auto-stereoscopic display apparatus of claim 13, wherein the target visible distance is greater than the reference visible distance, one pixel of the original pixel unit is defined as a dummy pixel, wherein the dummy pixel is excluded from the compensated pixel unit such that a width of the compensated pixel unit becomes narrower than a width of the original pixel unit by a width of the dummy pixel.

* * * * *